United States Patent [19]
Kagami et al.

[11] Patent Number: 5,474,854
[45] Date of Patent: Dec. 12, 1995

[54] POLYESTER COMPOSITION AND FILM MADE THEREFROM

[75] Inventors: Nobuyuki Kagami; Masatoshi Aoyama; Masaru Suzuki, all of Shizuoka; Keisuke Oshima, Shiga, all of Japan

[73] Assignee: Toray Industries, Inc., Japan

[21] Appl. No.: 256,303

[22] PCT Filed: Nov. 10, 1993

[86] PCT No.: PCT/JP93/01631

§ 371 Date: Aug. 9, 1994

§ 102(e) Date: Aug. 9, 1994

[87] PCT Pub. No.: WO94/11438

PCT Pub. Date: May 26, 1994

[30] Foreign Application Priority Data

Nov. 11, 1992 [JP] Japan .................................. 4-301355
Nov. 11, 1992 [JP] Japan .................................. 4-301356

[51] Int. Cl.$^6$ ............................................. B32B 27/36
[52] U.S. Cl. .................... 428/482; 528/176; 528/205; 528/219; 528/272; 528/296; 528/300; 528/302; 528/303; 528/306; 528/307; 528/308; 528/308.6; 525/437; 525/445; 525/168; 428/141; 428/143; 428/364; 428/480
[58] Field of Search ........................... 528/272, 296, 528/176, 205, 219, 300, 302, 303, 306, 307, 308, 308.6; 525/437, 445, 168; 428/364, 480, 482, 141, 143

[56] References Cited

U.S. PATENT DOCUMENTS

| | | | |
|---|---|---|---|
| 4,664,965 | 5/1987 | Okita et al. | 428/143 |
| 5,326,822 | 7/1994 | Hesse et al. | 525/168 |
| 5,389,422 | 2/1995 | Okazaki et al. | 428/141 |

FOREIGN PATENT DOCUMENTS

| | | |
|---|---|---|
| 59-217755 | 2/1984 | Japan . |
| 61-174254 | 8/1986 | Japan . |
| 2189359 | 7/1990 | Japan . |

*Primary Examiner*—Samuel A. Acquah
*Attorney, Agent, or Firm*—Austin R. Miller

[57] ABSTRACT

The invention is a polyester composition containing crosslinked polymer particles with ester bonds at the main chain. The particles are excellent in affinity to polyesters, and so the films formed from the polyester compositions do not have the particles falling off during high speed running, and do not have flaws in the film surfaces. The invention can prevent the generation of white powder and the flaws of magnetic faces caused by falling-off particles, and prevent the contamination in the production of films, even though these are problems caused when various conventional particles are added, and is especially suitable for use as products such as magnetic films.

23 Claims, No Drawings

POLYESTER COMPOSITION AND FILM MADE THEREFROM

TECHNICAL FIELD

The present invention relates to polyester compositions and films made therefrom excellent in abrasion resistance and magnetic surface flaw preventability when the films run at high speeds.

BACKGROUND ART

In general, polyesters such as polyethylene terephthalate are excellent in mechanical properties and chemical properties, and are widely used as formed products such as films and fibers. When the polyesters are processed and used as formed products, their slipping property and abrasion resistance greatly affect the workability in their production and various applications. For example, if a polyester tape insufficient in such properties is used as a base film for producing a magnetic tape, the friction between the coating roll and the film during magnetic tape production becomes large, thereby wrinkling or scratching the film. Moreover, the film is liable to be abraded to generate powder, and when the film is coated with a magnetic layer, it may have portions devoid of the magnetic layer, and as a result, missing of magnetic recording (drop-out) is likely to occur. Furthermore, as a recently identified disadvantage, when the film is wound after completion of calendering in the step of magnetic layer coating, the magnetic face is rubbed by the non-magnetic face, to be flawed, thereby causing quality deterioration such as drop-out in use as a product.

For improving the slipping property of a film, many proposals have been made for letting polyesters contain inorganic particles such as titanium dioxide, calcium carbonate and silicon dioxide. However, these inorganics particles which are low in affinity to polyesters easily fall off, producing scrapings, degrading in slipperiness or suffering from flaws on the surface, when an external force acts during use, for example, as a film, due to contact with rolls during calendering in the step of magnetic layer coating or during film running or due to inter-layer contact of the film during winding. If such scrapings are produced in large amounts or the surface is flawed, it would lead to imperfect formation of the magnetic layer during the coating process and the film may suffer from drop-outs during use. Furthermore, if the calender roll used in the step of magnetic layer coating is soiled, the workability in the production of magnetic recording film is remarkably lowered. Thus it has been hoped that the properties of these magnetic layers may be improved so that they do not suffer from flaws and abrasion due to low affinity to polyesters.

Methods proposed for improving the affinity between the particles and polyesters include the surface treatment of inorganic particles, the use of organic particles, etc. Conventional methods regarding surface treatment of inorganic particles include the surface treatment by polyacrylic-acid-based polymers proposed in Japanese Patent Laid-Open (Kokai) No. 63-128031, the surface treatment by phosphorus-containing compounds proposed in Japanese Patent Laid-Open (Kokai) Nos. 62-235353 and 63-234039, the surface treatment by coupling agents proposed in Japanese Patent Laid-Open (Kokai) Nos. 62-223239 and 63-312345, the surface treatment by silane compounds proposed in Japanese Patent Laid-Open (Kokai) No. 63-304038 and the surface treatment by grafting using a glycol proposed in Japanese Patent Laid-Open (Kokai) No. 88-280763. However, even these methods cannot achieve sufficient abrasion resistance since it is difficult to obtain satisfactory affinity because the particles used are inorganic.

For organic particles, various kinds are proposed, for example, in Japanese Patent Laid-Open (Kokai) No. 49-117550 (polyethylene terephthalate particles and poly-1, 4-bis(hydroxymethyl)-cyclohexane terephthalate particles), Japanese Patent Laid-Open (Kokai) No. 50-14748 (polyethylene naphthalate resin), Japanese Patent Laid-Open (Kokai) No. 54-132652 (polyphenyl ester resin), etc. However, since these particles are of linear polymers without crosslinking structure, they are insufficient in heat resistance, and the thermal history of high temperatures inflicted during the production of polyesters and films makes the particles poorly stable, thereby disadvantageously not allowing the films to be sufficiently resistant against abrasion. Furthermore, organic particles with crosslinked structure are proposed, for example, in Japanese Patent Laid-Open (Kokai) No. 59-217755 (crosslinked polymer particles sharp in grain size distribution), Japanese Patent Laid-Open (Kokai) No. 61-174254 (crosslinked polymer particles capable of reacting with polyesters) and Japanese Patent Laid-Open (Kokai) No. 2-189359 (vinyl compound/divinylbenzene copolymer particles, dicarboxylic acid/acrylate copolymer particles, etc.), etc. However, a problem of these particles is that they are not of polyesters, even though they are relatively high in heat resistance. Since ester bonds do not exist at the main chain of the polymer forming the particles, the polymer cannot exhibit its affinity with the polyester used as the matrix, and the film containing them cannot have high abrasion resistance when it runs at a high speed.

The inventors studied intensively, and as a result, found that particles made of a crosslinked polymer with ester bond at its main chain are very high in affinity with polyesters, and that films containing them are remarkably higher in abrasion resistance and magnetic face flaw preventability when they are run at high speeds. The object of the present invention is to overcome the above mentioned disadvantages of the prior art, and to present polyester composition excellent in abrasion resistance and magnetic face flaw preventability when the films formed from them are run at high speeds.

DISCLOSURE OF THE INVENTION

The present invention is a polyester composition comprising particles made of crosslinked polymer with ester bond at its main chain, and also a film made of the polyester composition.

BEST MODE FOR CARRYING OUT THE INVENTION

The crosslinked polymer used for forming the particles of the present invention is not especially limited as far as it has ester bond at its main chain and a crosslinked structure. The polymers with ester bond at the main chain used for forming the particles include, for example, polyesters composed of a polybasic acid and a polyhydric alcohol and polyphenyl esters composed of a phenyl ester and a polyhydric alcohol. Especially a polyester composed of a polybasic acid and a polyhydric alcohol is preferable.

The particles made of a crosslinked polymer with such a main chain can be, as one type, particles made of an unsaturated polyester resin crosslinked by a compound with an aliphatic unsaturated bond. An unsaturated polyester can be prepared from a dicarboxylic acid or any of its ester formable derivatives (A), a glycol (B) and a compound with an aliphatic unsaturated bond capable of crosslinking the unsaturated polyester (C). In this case, it is necessary that at least either monomer of the dicarboxylic acid or any of its ester formable derivatives (A) or the glycol (B) has an aliphatic unsaturated bond.

The dicarboxylic acid (A) as a compound with an aliphatic unsaturated bond may be such as substance as maleic acid or its anhydride, methylmaleic acid, fumaric acid, methylfumaric acid, glutaconic acid, acetylenedicarboxylic acid, 2-butyne-1,4-dicarboxylic acid, and their ester formable derivatives. Among them, maleic acid or its anhydride and fumaric acid are preferable. On the other hand, the glycol (B) may be such a substance as propenediol, butenediol, hexenediol, dimethylhexenediol, hexadienediol, hexadiynediol, octadiynediol, acetylenediol, etc., and their ester formable derivatives. Among them, propenediol, butenediol and hexenediol are preferable.

The compound (C) with an aliphatic unsaturated bond capable of crosslinking the unsaturated polyester may be, for example, an aromatic monovinyl compound such as styrene, α-methylstyrene, chlorostyrene, fluorostyrene, ethylvinylbenzene, vinyltoluene and vinylpyridine etc., divinyl compounds such as divinylbenzene, diallylphthalate and divinyl ether etc., vinyl cyanide compounds such as acrylonitrile and methacrylonitrile etc., acrylates or acrylic esters such as methyl acrylate, ethyl acrylate, propyl acrylate, butyl acrylate, hydroxyethyl acrylate, glycidyl acrylate and vinylacetate methyl acrylate, methacrylates or methacrylic esters such as methyl methacrylate, ethyl methacrylate, propyl methacrylate, butyl methacrylate, allylmethacrylate, phenylmethacrylate, hydroxyethyl methacrylate, glycidyl methacrylate and vinylacetate methyl methacrylate, polyvalent acrylates such as ethylene glycol diacrylate, butylene glycol diacrylate, polyethylene glycol diacrylate, diglycidyl ether diacrylate and trimethylolpropane triacrylate, polyvalent methacrylates such as ethylene glycol dimethacrylate, butylene glycol dimethacrylate, polyethylene glycol dimethacrylate, diglycidyl ether dimethacrylate and trimethylolpropane trimethacrylate, amide monomers such as acrylamide and methacrylamide, and acetylene compounds such as methylacetylene, ethylacetylene, dimethylacetylene and diethylacetylene. Among them, aromatic monovinyl compounds, divinyl compounds, acrylates, methacrylates, acrylic esters, methacrylic esters, polyvalent acrylates and polyvalent methacrylates are preferable.

The unsaturated polyester resin of the present invention can also be formed by respectively plural compounds of (A), (B) and (C). Furthermore, the compound (A) may partially include a saturated dicarboxylic acid or the compound (B) may partially include a saturated glycol. The saturated dicarboxylic acid may be such a substance as terephthalic acid, 2,6-naphthalenedicarboxylic acid, diphenyldicarboxylic acid, isophthalic acid, phthalic acid, succinic acid, adipic acid, sebacic acid or their ester formable derivatives etc. Among these saturated dicarboxylic acids, terephthalic acid, 2,6-naphthalenedicarboxylic acid, diphenyldicarboxylic acid, isophthalic acid and their ester formable derivatives are preferable. Furthermore, the saturated glycol may be such a substance as ethylene glycol, diethylene glycol, butylene glycol, propylene glycol, dipropylene glycol, trimethylene glycol, tetramethylene glycol, pentyl glycol, neopentyl glycol, hexamethylene glycol, polyethylene glycol, cyclohexanedimethanol, bisphenol A, bisphenol S or their hydrognated compounds etc. Among these saturated glycols, ethylene glycol, cyclohexanedimethanol, bisphenol A and bisphenol S are preferable. The amount of the saturated dicarboxylic acid or saturated glycol should be preferably 80 mol % or less, more preferably 70 mol % or less against all the carboxylic acid components or all the glycol components in view of the heat resistance of the particles.

The above mentioned unsaturated polyester resin in the present invention can be prepared by any conventional process. For example, after a linear polyester with aliphatic unsaturated bonds is prepared from the compound (A) and the compound (B), the compound (C) is caused to react for crosslinking it by suspension polymerization. In this case, the ester interchange or esterification between the compounds (A) and (B) is followed by condensation polymerization, to prepare the intended polyester with aliphatic unsaturated bonds. Then, the polyester and the compound (C) are suspended and dispersed into a solvent such as water which does not dissolve them at all or little dissolves them, and furthermore any known catalyst, for example, an organic peroxide such as benzoyl peroxide, ethyl methyl ketone peroxide or lauroyl peroxide is added for polymerization, to obtain a crosslinked polymer resin. The preparation of the unsaturated polyester resin by suspension polymerization as described above is preferable because of such advantages that the affinity with polyesters can be specifically enhanced, that the particles contain less impurities such as emulsifying agent and that the particle size can be easily controlled.

The crosslinked polymer particles of the present invention can also be prepared by the following emulsion polymerization methods, instead of the above described suspension polymerization method.

(a) Soap-free polymerization method, in which no emulsifying agent or a very small amount of an emulsifier is used for polymerization.

(b) Seed polymerization method, in which polymer particles are added into the polymerization system prior to emulsion polymerization.

(c) Core-shell polymerization method, in which a part of monomer components are emulsion-polymerized and the remaining monomer components are polymerized in the same polymerization system.

(d) Polymerization methods employing the Ugelstad, etc. disclosed in Japanese Patent Laid-Open (Kokai) Nos. 54-97582 and 54-126288.

(e) Polymerization methods without using any swelling assistant in the methods of (d).

The particles made of a crosslinked polymer with ester bonds at its main chain in the present invention can also be, as another preferable type, the particles of a polyester resin with a polyhydric alcohol (D) and a polybasic acid (E) as main components, at least either of the components being tri- or higher-valent.

The polyhydric alcohol (D) refers to a compound with at least two or more hydroxyl groups in one molecule, and may be such a substance as ethylene glycol, diethylene glycol, butylene glycol, propylene glycol, dipropylene glycol, trimethylene glycol, tetramethylene glycol, hexamethylene glycol, pentyl glycol, neopentyl glycol, polyethylene glycol, cyclohexanedimethanol, bisphenol A, bisphenol S or their hydrogenated compounds, and furthermore the tri- or higher-hydric alcohol may be such a substance as glycerol, trimethylolethane, trimethylolpropane, trimethylolbutane, trimethylolbenzene, hexanetriol, pentaerythritol, sorbitol, tetramethylolcyclohexanol, etc. Among them, especially, ethylene glycol, butylene glycol, hexamethylene glycol, polyethylene glycol, cyclohexanedimethanol, bisphenol A, bisphenol S, glycerol, trimethylolpropane and pentaerythritol are preferable.

The polybasic acid (E) refers to a compound with at least two or more carboxyl groups in one molecule, and may be, for example, an aromatic dicarboxylic acid such as terephthalic acid, isophthalic acid, napthalenedicarboxylic acid, 5-sodium sulfoisophthalic acid, diphenyldicarboxylic acid and phthalic acid, aliphatic dicarboxylic acids such as adipic acid, sebacic acid, dimeric acid, maleic acid, maleic anhydride, fumaric acid, oxalic acid and succinic acid, alicyclic dicarboxylic acids such as cyclohexanedicarboxylic acid, or their ester formable derivatives etc. Furthermore, the tri- or higher-carboxylic acid may be such a substance as hemimellitic acid, trimesic acid, trimellitic acid, prehnitric acid, pyromellitic acid, mellophanic acid, or their ester formable derivatives, etc. Among the polybasic acids (E) enumerated above, terephthalic acid, isophthalic acid, naphthalenedicarboxylic acid, diphenyldicarboxylic acid, adipic acid, sebacic acid, maleic acid, maleic anhydride, fumaric acid, succinic acid, trimesic acid, trimellitic acid, pyromellitic acid or their ester formable derivatives are preferable.

Furthermore, the crosslinked polymer can also be formed by using plural compounds of polyhydric alcohol (D) or polybasic acid (E).

The crosslinked polymer particles composed of the polyhydric alcohol (D) and the polybasic acid (E) in the present invention can be prepared by any conventional method for preparing polyester resins. That is, the particles can be prepared by transesterification or esterification of the polyhydric alcohol (D) and the polybasic acid (E), and subsequent condensation polymerization.

In the crosslinked polymer particles of the present invention, the crosslinking degree defined by the following formula (1) for all the organic components forming the particles should be preferably 1 wt % or more.

*Crosslinking degree=(Weight of crosslinked component in raw monomers)/(Total weight of raw monomers)× 100(%)* (1)

A preferable degree is 5 wt % or more, and a more preferable degree is 10 wt % or more. When the crosslinking degree is kept in this range, the particles can be elastic, to stabilize the protrusion forms in the film, for improving the slipperiness and abrasion resistance in the high speed running of the film. Moreover, as described later, the thermal decomposition temperature of the particles can be raised, and in this case, preferably it cannot happen that the particles are agglomerated to impair the film surface uniformness, abrasion resistance, etc. during the production of the polyester composition, during its melt molding or in the recycled re-utilization of formed products.

The crosslinked polymer particles of the present invention can be structurally uniform or non-uniform or even hollow. In the case of non-uniform structure, for example, two or more structural patterns may be mixed. For example, the core of each particle and the external layer around it may be different in the kind and quantity of the non-crosslinked component and in the kind and quantity of the crosslinked component. Moreover, each particle may have portions different in composition from the particle itself dispersed.

The crosslinked polymer particles in the present invention should be preferably 0.01 to 5 μm, more preferably 0.03 to 1 μm in average diameter, and should be contained in the polyester composition by preferably 0.005 to 10 wt %, more preferably 0.01 to 5 wt % based on the weight of the polyester composition. When the average diameter of the particles and the content in the polyester composition are kept in the above respective ranges, the film made of it can exhibit slipperiness and abrasion resistance. The average diameter in this case refers to a number average diameter obtained by photographing the particles in a polymer or film by an electron microscope at a magnification of about 20,000 to 50,000 times (30 photos of 8 cm× 10 cm in size), and measuring and calculating the equivalent sphere diameters of the particles. The equivalent sphere diameter refers to a diameter of a sphere with a volume equal to that of a particle.

To prepare such fine crosslinked polymer particles, in the case of particles made of an unsaturated polyester resin, for example, the dispersion medium of the monomers can be stirred at a high speed for suspension polymerization. On the other hand, in the case of particles composed of a polyhydric alcohol and a polybasic acid, the crosslinked polymer resin can be ground by a medium type mill such as roll mill, sand mill or ball mill, or furthermore classified using a decanter, etc.

If the crosslinked polymer particles of the present invention are more than 1.1 to less than 5.0 in ratio Dw/Dn, where Dw is the weight average diameter and Dn is the number average diameter, the film obtained is preferably good in slipperiness and abrasion resistance. The weight average diameter and the number average diameter in this case are obtained by photographing the particles in a polymer or film by an electron microscope at a magnification of about 20,000 to 50,000 times (30 photos of 8 cm×10 cm in size), and measuring and calculating the equivalent sphere diameters of the particles. The equivalent sphere diameter refers to a diameter of a sphere with a volume equal to that of a particle.

As for the heat resistance of the crosslinked polymer particles, the thermal decomposition temperature (10% weight loss temperature) of the particles measured by a thermobalance should be preferably 350° C. or higher, more preferably 360° C. or higher, further more preferably 380° C. or higher. In this case, preferably it cannot happen that the particles are agglomerated to impair the film surface uniformness, abrasion resistance, etc. during the production of the polyester composition, during its melt molding or in the recycled re-utilization of formed products.

In the present invention, to obtain films good in transparency and abrasion resistance, the crosslinked polymer particles should be preferably 20 to 95% in the porosity obtained from the following formula (2) in reference to the pore volume of each particle measured by a mercury porosimeter and to the specific gravity of the particle.

*Porosity(%)=Pore volume/{(1/Specific gravity)+Pore volume}×100*

(2)

A more preferably porosity is 30 to 80%, and a further more preferably porosity is 40 to 70%. If the porosity is less than 20%, the film formed has voids to impair transparency, slipperiness and abrasion resistance, and if more than 95%, the particles are poor in form stability.

It is preferable that the crosslinked polymer particles of the present invention are treated on the surfaces by a compound with an alkali metal salt of a functional groups such as carboxyl group, to ensure both good affinity with polyesters and good dispersion property. The alkali metal salt of carboxyl group can be selected from sodium salt, potassium salt, lithium salt, etc., and among them, sodium salt of carboxyl group is preferable in view of higher affinity. The chemical species with a functional group for introducing the alkali metal salt of carboxyl group can be either a monomer or a polymer, and is not especially limited. Above all, methacrylic acid, acrylic acid and their polymers are preferable. Moreover, the chemical species with a carboxyl group may also be copolymerized with a chemical species without any functional group or a chemical species with any other functional group than carboxyl group. In this case, in view of heat resistance, a styrene compound is preferable. The method for introducing the alkali metal salt of carboxyl group is not especially limited, but in view of heat resistance of the particles, it is preferable to one produce the crosslinked polymer particles and then to add a surface treating agent, for adsorption or reaction on the surfaces. For example, to introduce Na methacrylate, at first the crosslinked polymer particles are produced and subsequently styrene or methacrylic acid is added for partial polymerization, to keep the system on the alkali side, so that —COONa group by Na methacrylate may be introduced into the surfaces of the particles. The amount of the surface treating agent should be preferably 0.01 to 20 wt %, more preferably 0.1 to 10 wt % based on the weight of the particles.

In the present invention if at least one ore more kinds of conventional inorganic particles and organic particles are contained in addition to the crosslinked polymer particles, the film running ability and abrasion resistance can be improved preferably. The compound of the inorganic particles can be selected, for example, from inorganic oxides such as aluminum oxide, zirconium oxide and silicon oxide, inorganic carbonates such as calcium carbonate and barium carbonate, inorganic phosphates such as calcium phosphate and sodium phosphate, inorganic sulfates such as barium sulfate and calcium sulfate, inorganic mixed oxides such as kaolin and talc, fluorides such as fluorite, and also potassium titanate, aluminum hydroxide, etc. The organic particles can be selected from silicone particles, teflon particles, polyimide particles, etc. Among them, titanium oxide, silicon oxide, calcium carbonate, zirconium oxide, aluminum oxide and silicone particles are preferable. The average diameter of these inorganic particles and organic particles should be preferably 0.001 to 3 µm, more preferably 0.002 to 2 µm. Their content should be preferably 0.001 to 20 wt %, more preferably 0.002 to 15 wt % based on the weight of the polyester composition. Furthermore, in addition to the above inorganic and organic particles, it is also possible to additionally use non-incorporated particles composed of at least one of aromatic carboxylates, alkali metals and alkaline earth metals, and a phosphorus compound, which are precipitated in the reaction system in the production of the polyester.

In the present invention, the crosslinked polymer particles and inorganic particles can be added to be contained in the polyester, by any conventional method, for example, by adding as a powder or glycol slurry into the reaction system of the polyester, or kneading as a powder or a slurry using a low boiling-point solvent into the polyester. Especially the crosslinked polymer particles of the present invention should be preferably kneaded as a slurry with the particles in water and/or in an organic compound of 200° C. or lower in boiling point into the polyester by a vent-type molding machine, in view of the uniform dispersion of the particles. In this case, carrying out melt kneading after removing the water and/or organic compound of 200° C. or lower in boiling point by heating under reduced pressure is preferable since the dispersiblity of the particles can be improved. The vent-type molding machine refers to a melt molding machine with at least one vent hole, and can be, for example, an extruder or injection molding machine. At least one of the vent holes for removing the water and/or organic compound of 200° C. or lower in boiling point must be kept under reduced pressure. The vent hole should be preferably kept at a reduced pressure of 100 Torrs or less, more preferably at 50 Torrs or less, further more preferably at 30 Torrs or less.

When the crosslinked polymer particles of the present invention are added to the polyester as a slurry of water and/or an organic compound of 200° C. or less in boiling point, the organic compound of 200° C. or lower in boiling point is not especially limited and can be selected, for example, from alcohols such as methanol, ethanol and ethylene glycol, hydrocarbons such as benzene and toluene, and also esters, ketones, amines, etc. Among them, water is preferable in view of handling, removability, etc. Of course, the water and/or organic compound of 200° C. or lower in boiling point can be a mixed solvent consisting of two or more solvents. In this case, a water-rich mixed solvent is preferably.

The slurry of the crosslinked polymer particles can preferably contain an anionic interfacial active agent such as sodium dodecylbenzene sulfonate or sodium lauryl sulfate, a nonionic interfacial active agent such as polyoxyethylene nonyl phenyl ether or polyethylene glycol monostearate, a dispersing agent such as polyvinyl pyrrolidone, polyvinyl alcohol or carboxymethyl cellulose.

The concentration of the slurry with the crosslinked polymer particles in water and/or organic compound of 200° C. or lower in boiling point is not especially limited. However, it is preferable that the amount of the water and/or organic compound of 200° C. or lower in boiling point added is 2 to 30 wt %, more preferably 2 to 20 wt % based on the weight of the polymer, and in this case, the dispersibility of the particles in the polymer is good, and the intrinsic viscosity of the polymer is not lowered preferably.

The crosslinked polymer particles of the present invention can also be dispersed into the glycol component used as a raw material of the polyester, to make a slurry, and adding the slurry at any optional stage before the completion of polyester production, instead of being kneaded into the polyester as a slurry with the particles in water and/or organic compound of 200° C. or lower in boiling point by a vent type molding machine as described above.

The polyesters used in the present invention is produced from a dicarboxylic acid with an aromatic dicarboxylic acid as the main acid component or any of its ester formable derivatives and a glycol, and mainly include polyalkylene terephthalate, polyalkylene naphthalate, etc. Among these polyesters, polyethylene terephthalate and polyethylene-2, 6-napthalate are especially preferably.

The polyesters of the present invention can be either homopolyesters or copolyesters. The comonomer for the copolyesters can be selected, for example, from aromatic dicarboxylic acids such as terephthalic acid, isophthalic acid, naphthalenedicarboxylic acid, 5-sulfoisophthalic acid, diphenyldicarboxylic acid and phthalic acid, aliphatic dicarboxylic acids such as adipic acid, sebacic acid, dimeric acid, maleic acid, fumaric acid, oxalic acid and succinic acid, alicyclic dicarboxylic acids such as cyclohexanedicarboxylic acid, aliphatic glycols such as ethylene glycol, propanediol, butanediol, pentanediol, hexanediol, neopentyl glycol, diethylene glycol and polyethylene glycol, aromatic glycols such as bisphenol A and bisphenol S, alicyclic glycols such as cyclohexanedimethanol, polyfunctional compounds such as trimellitic acid, trimesic acid and trimethylolpropane and oxycarboxylic acids such as p-hydroxybenzoic acid. One or more in combination of these comonomers can be used.

The polyesters of the present invention can be produced by an optional conventional method. In the case of producing polyethylene terephthalate, for example, dimethyl terephthalate and ethylene glycol may be transesterified in the presence of a catalyst, followed by condensation polymerization at a high temperature under reduced pressure in the presence of a polymerization catalyst. As another method, esterification of terephthalic acid and ethylene glycol can be followed by condensation polymerization. In this case, it is preferable to add a coloring preventive agent such as a phosphorus compound at any optional stage before completion of condensation polymerization and preferably after completion of ester interchange or esterification. As a further other method, solid state polymerization can be used, in which after completion of ester interchange or esterification, condensation polymerization is effected up to a certain degree of polymerization, being followed by further condensation polymerization with the obtained polymer kept at a temperature lower than its melting point under reduced pressure or in inactive gas current.

The production of the polyesters of the present invention allows the use of conventional ester interchange catalysts, condensation polymerization catalysts and coloring preventive agents. The ester interchange catalysts include, for example, aliphatic carboxylates of alkaline earth metals, zinc, maganese and alkali metal compound, halogenide and metal glycolates, etc., concretely, manganese acetate, magnesium acetate, calcium acetate, zinc acetate, lithium acetate, potassium acetate, sodium acetate, magnesium propionate, manganese propionate, potassium propionate, calcium propionate, zinc propionate, magnesium chloride, lithium chloride, manganese bromide, magnesium hydroxide, manganese hydroxide, calcium hydroxide, zinc hydroxide, lithium hydroxide, magnesium glycolate, calcium glycolate, lithium methylate, butyl potassium, etc. The condensation polymerization catalysts include for example, antimony compounds such as antimony trioxide, germanium compounds such as germanium dioxide, and titanium compounds such as tetrabutyl titanate. The coloring preventive agents include phosphorus compounds such as phosphates, monomethyl phosphate, dimethyl phosphate, trimethyl phosphate, tributyl phosphate, phosphites, trimethyl phosphite and tributyl phosphite, etc.

The polyester compositions of the present invention can be applied to either single-layer or laminated films, but in view of film running ability and abrasion resistance, a laminated film containing at least one layer made of the composition of the present invention is preferable.

The laminated film in this specification refers to a film with at least two layers in film thickness direction, and, therefore, includes a film consisting of three or more layers. Furthermore, it is preferable in view in view of film running ability that the outermost surface layer at least on one side is made of the polyester composition of the present invention. A laminated film with layers made of the polyester composition of the present invention on both sides is especially preferable.

The laminated film can be composed variously. For example, a two-layer laminated film can simply consist of a layer containing the crosslinked polymer particles of the present invention (layer X) and the other layer (layer Y), or the layer X may be coated on the surface with another layer (e.g., good adhesive layer), or the layer Y may be coated on the surface with another layer (e.g., good adhesive layer), or the surface of the layer Y may have a back coat layer. A three-layer laminated film can simply consist of layer X/layer Y/layer X, or the three-layer laminated film can also be coated with another layer on the layer X of one side, or coated with layers on the layers X of both sides (on both sides of the laminated film). In this case, the thickness of a layer X should be preferably 0.01 to 3.0 μm, more preferably 0.05 to 2.0 μm, further more preferably 0.01 to 1.5 μm, and the thickness of the coated layer should be preferably 0.01 to 1.0 μm. Laminated films consisting of four or more layers simply have more layers Y (intermediate layers) in addition to the above three-layer laminated film, and the positional relation between layers X and coated layers is the same as in the three-layer laminated film. Furthermore, a laminated film using different layers on both outermost sides, for example, a three-layer laminated film consisting of layer X/layer Y/layer Z can also be used.

In the laminated film as described above, the ratio of t/D, where t is the thickness of the outermost layer (μm) and D is the average diameter (μm) of the crosslinked polymer particles of the present invention, should be preferably 0.1 to 10, more preferably 0.3 to 5, further more preferably 0.5 to 3. Moreover, in the laminated film, it is preferable that the number of protrusions on the surface of the outermost layer is $3 \times 10^3$ to $2 \times 10^5/mm^2$, more preferably $5 \times 10^3$ to $1.5 \times 10^5/mm^2$. The protrusions on the surface of the outermost layer refer to the protrusions of 60 to 2000 nm in height. Furthermore, in the laminated film, of the protrusions existing on the surface of the outermost layer, it is preferable that the number of protrusions of 0.7 to 2.6 μm in diameter is 100 to $10,000/mm^2$, more preferably 300 to $9,000/mm^2$, further more preferably 500 to $8,000/mm^2$. The laminated film with t/D, the number of protrusions and the diameter of protrusions kept in the above ranges is good in film slipperiness and abrasion resistance.

The method for producing such a laminated film is described below concretely. At first, the pellets of a polyester are mixed at predetermined rates, and the mixtures are dried, supplied into conventional melt lamination extruders, extruded as a sheet from a slit die, and cooled and solidified on a casting roll, to prepare a non-stretched film. That is, two or more extruders and a two- or more-layer manifold or feed block (e.g., feed block with a rectangular laminating portion) are used for laminating, and a two- or more-layer sheet is extruded from a die and cooled on a casting roll, to form a non-stretched film. In this case, installing a static mixer and a gear pump in the polymer passage or keeping the melting temperature of extruder for extruding the polymer of the outermost layer at 5° to 10° C. lower than that for the base layer are effective to improve the uniformness of the film thickness.

Then, the non-stretched film is biaxially stretched, to be biaxially oriented. For stretching, either sequential biaxially stretching process or simultaneous biaxially stretching process can be used. However, sequential biaxially stretching process for at first stretching in longitudinal direction and subsequently stretching in transverse direction with the stretching in longitudinal direction effected in 3 or more stages with the total longitudinal stretching ratio kept at 3.5 to 6.5 times is especially preferable. The longitudinal stretching temperature depends on the polyester used and cannot be specified generally, but it is usually effective to set the temperature at the first stage at 50° to 130° C., and those of the second and later stages at higher than the temperature for the first stage. The longitudinal stretching speed should be preferably 5,000 to 50,000%/min. The transverse stretching is generally effected by using a stenter. The proper stretching ratio is 3.0 to 5.0 times. The proper transverse stretching speed is 1,000 to 20,000%/min., and the proper transverse stretching temperature is 80° to 160° C. Subsequently, the stretched film is heat-treated. The heat treatment temperature in this case should be preferably 170° to 220° C., more preferably 180° to 200° C., and the heat treatment time should be preferably 0.2 to 20 seconds.

The surface roughness of the film should be preferably 40 or less, more preferably 30 or less, further more preferably 20 or less in surface roughness parameter, Rt/Ra, which is the ratio of the maximum height, Rt, to the center line average height, Ra, in view of good abrasion resistance.

Furthermore, with regard to the distribution of surface protrusion heights in the film of the present invention, uniform protrusion heights and good abrasion resistance can be achieved preferably if the relative standard deviation of protrusion heights is 1.0 or less, where a protrusion height is defined as the height of a 20 nm or higher protrusion.

EXAMPLES

The present invention is described below in more detail in reference to examples. Methods for measuring the respective physical values and the methods for evaluating the respective effects were as follows:

A. Particle Properties (1) Particle Diameter

The particles in a polymer of film were photographed using an electron microscope at a magnification of about 20,000 to 50,000 times (30 photos of 8 cm×10 cm in size), and the equivalent sphere diameters of the crosslinked polymer particles were measured. Then, weight average diameter Dw, number average diameter Dn and Dw/Dn were calculated. The equivalent sphere diameter refers to the diameter of a sphere with the same volume as that of a particle.

(2) Thermal Decomposition Temperature of Particles

The curve of loss in weight of thermobalance was measured by TAS-100 produced by Rigaku Denki in nitrogen gas atmosphere at a heating rate of 20° C./min., and the 10% weight loss temperature was identified as the thermal decomposition temperature.

(3) Porosity

The pore volume of a particle was measured by a mercury porosimeter, and the porosity was obtained from the following formula in reference to the pore volume and the specific gravity of the particle.

Porosity(%)=Pore volume/{(1/Specific gravity)+Pore volume}×100

B. Polymer Property (1) Intrinsic Viscosity

Measured with o-chlorophenol as the solvent at 25° C.

C. Film Properties (1) Surface Roughness Parameters Ra and Rt

A high precision thin film level difference measuring apparatus, ET-10 produced by Kosaka Kenkyuji was used for measurement. Ra is the center line average roughness and Rt is the maximum height which expresses the distance between the highest crest and the lowest trough in the roughness curve. The measurement was effected under the following conditions, and the average value of 20 times of measurement was adopted.

| Probe tip radius: | 0.5 μm |
|---|---|
| Probe load: | 5 mg |
| Measured length: | 1 mm |
| Cut off value: | 0.08 mm |

The respective parameters are defined in detail, for example, in Jiro Nara, "Methods for Measuring and Evaluating Surface Roughnesses (in Japanese)" (Sogo Gijutsu Center, 1983).

(2) Laminated Layer Thickness, t

When the particles contained most in a film were the crosslinked polymer particles, the depth profile of the particle densities was measured by XPS (X-ray photoelectron spectrum), IR (infrared spectroscopic analysis) or confocal microscope, etc. with etching from the surface. In the surface layer in a film with a laminated layer on one side, the particle density is low because of the interface called the surface, and the particle density becomes higher according to the increase in distance from the surface.

In a film with a laminated layer on one side of the present invention, the particle density once becomes maximum at depth [I] and begins to decrease again. Based on the particle density curve, the depth [II] (II>1) at which the particle density is ½ of the maximum value is defined as the laminated layer thickness, t. For other laminated films, similar analysis was made starting from the portion where the particle density began to appear. When inorganic particles, etc. were contained, the density of the element concerned with the particles with the highest density among the particles of the film was measured using a secondary ion mass spectrum (SIMS) instrument, and ratio of the density to the density of the carbon element in the polyester ($M^+/C^+$) was identified as the particle density. Analysis was effected in the depth (thickness) direction from the surface of the layer X of polyester, and as done above, the laminated layer thickness, t can be obtained. Furthermore, it can also be obtained by observing the cross section of a film or using a level difference measuring apparatus.

(3) Running Ability

A slit film with a width of ½ inch was run using a tape running tester, Model TBT-300 (produced by K. K. Yokohama System Kankyujo) at 20° C. and 60% RH, and the initial friction coefficient μk was obtained from the following formula. The guide diameter was 6 mm, and the guide material was SUS 27 (surface roughness 0.2S). The winding angle was 180° and the running speed was 3.3 cm/sec.

$$\mu k = 0.733 \times \log (T_1/T_2)$$

$T_1$: Outgoing-side tension $T_2$: Incoming-side tension

If the above μk is 0.35 or less, the film is good in slipperiness. If μk is larger than 0.35, slipperiness is very poor during film production or as a film product.

(4) Number, Heights and Diameters of Protrusions on the Surface of a Film

A two-detector type scanning electron microscope (ESM-3200 produced by Elionics Corporation) and a cross section measuring apparatus (PMS-1 produced by Elionics Corporation) were used to measure the heights of protrusions by scanning with the height of the flat face on the surface of a film as 0, and the measured values were applied to an image processor (IBAS-2000 produced by Karlzuis Corporation), for reconstructing a film surface protrusion image on the image processor. On the surface protrusion image, the protrusion portions were processed into binary numbers for obtaining the areas of the individual protrusions. From the areas, equivalent circle diameters were obtained to be adopted as protrusion diameters, and the number of protrusions of 0.7 to 2.6 μm in diameter was counted. Furthermore, the highest value of the binary numbers obtained from each protrusion portion was identified as the height of the protrusion. The measurement was effected 500 times at different places, and protrusions of 10 nm or more in height were identified as protrusions. Of the measured protrusions, the average value of their heights was identified as the average height. The magnification of the scanning electron microscope was selected in a range from 1,000 to 8,000 times, to measure the number of protrusions exceeding 60 nm, and the magnification of the scanning electron microscope was selected in a range from 10,000 to 50,00 times, to count the number of protrusions. As the case may be, the height information obtained by using a high precision light interference type three-dimensional surface analyzer (TOPO-3D produced by WYKO Corporation, with an objective lens of 40 to 200 magnifications using a high resolution camera is effective) can be adopted instead of the values of said SEM.

(5) Abrasion Resistance (High Speed Running)

A tape roll of a slit film of ½ inch was rubbed against a guide roll made of stainless steel SUS-304 at a winding angle of 60° at a speed of 250 m/min. at a tension of 95 g for 500 m, to judge the abrasion resistance in reference to the white powder generated on the surface of the guide roll according to the following criterion. Grades A and B are acceptable.

Grade A . . . No white powder was generated at all.
Grade B . . . Some white powder was generated.
Grade C . . . Rather much white powder was generated.
Grade D . . . Much white powder was generated.

(6) Magnetic Face Flaw Preventability

A marketed video tape was longitudinally wound around a pin of 7 mm in diameter at a tension of 100 g with the magnetic face as the surface. Furthermore, a slit sample film of ½ in width was wound longitudinally to overlap the video tape at a winding angle of 120° at a tension of 50 g, and the sample film was reciprocated for a distance of 5 cm ten times at a running speed of 200 cm/min. The flaws caused on the magnetic face in this case were observed by a differential interference microscope at a magnification of 50 times. When few flaws were caused, the film was judged to be good in magnetic face flawing preventability, and when 20 or more flaws were caused, the film was judged to be poor in magnetic face flaw preventability.

(7) Electromagnetic Conversion Property

A film was coated with a magnetic coating solution composed as follows by a gravure roll, magnetically oriented and dried. Furthermore, it was calendered by a small test calender (steel roll/nylon roll, 5 steps) at 70° C. at a linear pressure of 200 kg/cm, and cured at 70° C. for 48 hours. The raw tape was slit at a width of ½ inch, and a pancake was prepared. The pancake was incorporated into a 250 m long VTR cassette, for use as a VRT cassette tape.

| (Composition of magnetic coating solution) | |
|---|---|
| Cobalt-containing iron oxide: | 100 parts by weight |
| Vinyl chloride/vinyl acetate copolymer: | 10 parts by weight |
| Polyurethane elastomer: | 10 parts by weight |
| Polyisocyanate: | 5 parts by weight |
| Lecithin: | 1 part by weight |
| Methyl ethyl ketone: | 75 parts by weight |
| Methyl isobutyl ketone: | 75 parts by weight |
| Toluene: | 75 parts by weight |
| Carbon black: | 2 parts by weight |
| Lauric acid: | 1.5 parts by weight |

The tape was used in a household VTR to record 100% chromatic signals using a television testing wave generator, and from the reproduced signals, chromatic S/N was measured using a color video noise measuring instrument.

EXAMPLE 1

One hundred parts by weight of dimethyl terephthalate, 70 parts by weight of ethylene glycol, 0.06 part by weight of magnesium acetate as an ester interchange catalyst, 0.03 part by weight of antimony trioxide as a polymerization catalyst and 0.03 part by weight of trimethyl phosphate as a thermal stabilizer were used to obtain a polyethylene terephthalate (I) of 0.65 dl/g in intrinsic viscosity not containing particles according to an ordinary method. The polyethylene terephthalate (I) was molten using a vent type twin-screw extruder, and a water slurry containing 20 wt % of crosslinked polymer particles composed of maleic acid/bisphenol A/styrene (1:1:1 as molar ratio) of 0.3 μm in number average diameter D, 1.3 in Dw/Dn, 70% in porosity and 400° C. in thermal decomposition temperature obtained by suspension polymerization was added to have 0.35 wt % of the crosslinked polymer particles contained in the polyester composition. With the vent hole kept at a vacuum degree of 10 Torrs, the mixture was melt-extruded at a resin temperature of 280° C., to obtain a polyethylene terephthalate composition containing the crosslinked polymer particles. The intrinsic viscosity of the polymer obtained was 0.62 dl/g.

Then, the polyethylene terephthalate composition was dried under reduced pressure at 180° C. for 3 hours, and melt-extruded at 290° C. and formed into a non-stretched film using the electrostatic casting method. Subsequently it was stretched to 4 times in longitudinal direction and 3.6 times in transverse direction, and heat-treated at 200° C. for 5 seconds with the size kept constant, to obtain a 13 μm thick film. The film was 0.013 in Ra, 0.25 in Rt, 0.22 in running ability μk, Grade A in abrasion resistance and good in magnetic face flaw preventability as shown in Table 1.

EXAMPLE 2

A film was obtained as done in Example 1, except that the crosslinked polymer particles used were made of an unsaturated polyester resin composed of maleic acid/ethylene glycol/styrene (1:1:1 as molar ratio) of 0.3 μm in number average diameter D, 1.3 in Dw/Dn, 65% in porosity and 390° C. in thermal decomposition temperature obtained by suspension polymerization. The film was good in running ability, abrasion resistance and magnetic face flaw preventability as shown in Table 1.

EXAMPLE 3

A polyethylene terephthalate composition was obtained as done in Example 1, except that the crosslinked polymer particles used were made of an unsaturated polyester resin composed of maleic acid/ethylene glycol/glycidyl methacrylate/styrene (2:2:1:1 as molar ratio) of 0.8 μm in number average diameter D, 1.4 in Dw/Dn, 70% in porosity and 390° C. in thermal decomposition temperature obtained by emulsion polymerization. The film was good in properties as shown in Table 1. Since the particles were obtained by emulsion polymerization, running ability and abrasion resistance were somewhat lower.

EXAMPLE 4

One hundred parts by weight of dimethyl terephthalate, 70 parts by weight of ethylene glycol, 0.1 part by weight of calcium acetate and 0.2 part by weight of lithium acetate as an ester interchange catalyst, 0.03 part by weight of antimony trioxide as a polymerization catalyst, 0.15 part by weight of trimethyl phosphate and 0.02 part by weight of phosphorous acid as a thermal stabilizer were used to obtain a polyethylene terephthalate composition (II) of 0.65 dl/g in intrinsic viscosity containing non-incorporated particles according to an ordinary method. Then, crosslinked polymer particles composed of maleic acid/fumaric acid/ethylene glycol/styrene (1:1:2:2 as molar ratio) of 0.2 μm in number average diameter D, 1.2 in Dw/Dn, 60% in porosity and 395° C. in thermal decomposition temperature obtained by suspension polymerization were added to the polyethylene terephthalate composition (II), to obtain a film as done in Example 1. The film was good in running ability, abrasion resistance and magnetic face flaw preventability as shown in Table 1.

EXAMPLE 5

Zirconium oxide of 0.03 μm in number average diameter was used as inorganic particles, and an ethylene glycol slurry of it was added after completion of ester interchange reaction, to obtain a polyethylene terephthalate composition (III) according to an ordinary method. Then, crosslinked polymer particles composed of terephthalic acid/propenediol/divinylbenzene of 0.5 μm in number average diameter D, 1.5 in Dw/Dn, 65% in porosity and 395° C. in thermal decomposition temperature were added to the polyethylene terephthalate composition (III) using a vent type twin-screw extruder, to obtain a film as done in Example 1. The film was good in abrasion resistance and magnetic face flaw preventability as shown in Table 1.

COMPARATIVE EXAMPLE 1

A film was prepared as done in Example 1, except that crosslinked polymer particles composed of divinylbenzene/ethylvinylbenzene (1:1 as molar ratio) of 0.3 μm in number average diameter D, 2.0 in Dw/Dn, 35% in porosity and 390° C. in thermal decomposition temperature produced by emulsion polymerization were used. Since the crosslinked polymer particles did not have ester bonds, the film was poor in running ability and abrasion resistance as shown in Table 2.

COMPARATIVE EXAMPLE 2

A film was obtained as done in Example 1, except that silicon dioxide particles of 0.5 μm in number average diameter D, 1.0 in Dw/Dn and 10% in porosity were used. Since inorganic particles were used, they were low in affinity, and the film was poor in running ability, abrasion resistance and magnetic face flaw preventability as shown in Table 2.

EXAMPLE 6

The crosslinked polymer particles shown in Table 3 were used to obtain a polyethylene terephthalate composition as down in Example 1. The polyethylene terephthalate composition and the polyethylene terephthalate (I) were dried under reduced pressure at 180° C. for 3 hours. Then the two polymers were supplied into respectively different extruders, molten at 290° C., highly accurately filtered while being laminated using a three-layer feed block with a rectangular laminating portion into a three-layer structure consisting of the polyethylene terephthalate (I) as the base layer and the polyethylene terephthalate composition as the surface layers on both sides, further extruded into a sheet from a fish tail type die, and wound around a casting drum of 30° C. in surface temperature, to be cooled and solidified using the electrostatic casting method, for producing an about 160 μm thick non-stretched film. The draft ratio was 6.5.

The non-stretched film was stretched in 3 stages in longitudinal direction to 1.2 times at 123° C. 1.45 times at 126° C. and 2.3 times at 114° C. respectively. The monoaxially stretched film was stretched in transverse direction using a stenter to 3.5 times at 111° C., and heat-treated at 200° C. for 5 seconds with the size kept constant, to obtain a 13 μm thick film (laminated layer thickness t=1.0 μm, t/D=2.5). As shown in Table 3, the content of the crosslinked polymer particles in the outermost surfaces of the obtained film was 0.36 wt %, and the film was good in running ability, abrasion resistance and magnetic face flawing preventability. The electromagnetic conversion property was measured and the chromatic S/N ratio was found to be +2.0 dB in reference to Example 5.

As described above, a film with a polyester composition containing the crosslinked polymer particles of the present invention laminated as the outermost surface layers can be good also in electromagnetic conversion property.

EXAMPLE 7

The crosslinked polymer particles shown in Table 3 were used to obtain a laminated film as done in Example 6. The film was good in running ability, abrasion resistance, magnetic face flawing preventability and electromagnetic conversion property as shown in Table 3.

COMPARATIVE EXAMPLES 3 AND 4

The crosslinked polymer particles or inorganic particles shown in Table 3 were used to obtain laminated films as done in Example 6. Comparative Example 3 used particles without ester bonds at the main chain and Comparative Example 4 used inorganic particles low in affinity. So, as shown in Table 3, the films were poor in running ability, abrasion resistance, magnetic face flaw preventability and electromagnetic conversion property.

EXAMPLE 8

A film was obtained as done in Example 1, except that crosslinked polymer particles of 0.3 μm in number average diameter D, 1.5 in Dw/Dn, 65% in porosity and 385° C. in thermal decomposition temperature obtained from terephthalic acid and pentaerythritol by condensation polymerization were used. The film was good in running property, abrasion resistance and magnetic face flaw preventability as shown in Table 4.

EXAMPLES 9 AND 10

Films were obtained as done in Example 1, except that particles different in composition, number average diameter, Dw/Dn, porosity, thermal decomposition temperature and content were used. These films were good in abrasion resistance and magnetic face flaw preventability as shown in Table 4. However, since particles rather low in thermal decomposition temperature were used in Example 10, the film was somewhat lower in abrasion resistance.

EXAMPLE 11

A film was obtained as done in Example 4 by letting the polyethylene terephthalate (II) containing non-incorporated particles contain the crosslinked polymer particles shown in Table 4. The film was good in running ability, abrasion resistance and magnetic face flaw preventability as shown in Table 4.

EXAMPLE 12

A film was obtained as done in Example 5 by letting the polyethylene terephthalate (III) containing zirconium oxide contain the crosslinked polymer particles shown in Table 4. The film was food in running ability, abrasion resistance and magnetic face flaw preventability as shown in Table 4.

COMPARATIVE EXAMPLES 5 AND 6

The particles shown in Table 5 were used to obtain films as done in Example 1. Since the particles were made of a non-crosslinked linear polyester, the films were poor in running ability, abrasion resistance and magnetic face flaw preventability as shown in Table 5.

EXAMPLES 13 and 14

The crosslinked polymer particles shown in Table 6 were used to obtain laminated films as done in Example 6. The films were good in running ability, abrasion resistance, magnetic face flawing preventability and electromagnetic conversion property as shown in Table 6.

COMPARATIVE EXAMPLE 7

The particles shown in Table 6 were used to obtain a laminated film as done in Example 6. Since the particles were made of a non-crosslinked linear polyester, the film was poor in running ability, abrasion resistance, magnetic face flaw preventability and electromagnetic conversion property as shown in Table 6.

TABLE 1

|  | Properties | Example 1 | Example 2 | Example 3 | Example 4 | Example 5 |
|---|---|---|---|---|---|---|
| Particles | Composition | Maleic acid/ bisphenol A/ styrene | Maleic acid/ ethylene glycol/styrene | Maleic acid/ ethylene glycol/ glycidyl methacrylate/ styrene | Maleic acid/ fumaric acid/ ethylene glycol/styrene + non-incorporated particles | Terephthalic acid/ propenediol/ divinylbenzene + zirconium oxide |
|  | Molar ratio of components | 1:1:1 | 1:1:1 | 2:2:1:1 | 1:1:2:2 | 1:1:1 |
|  | Production method | Suspension polymerization | Suspension polymerization | Emulsion polymerization | Suspension polymerization | Suspension polymerization |
|  | Average diameter (μm) | 0.3 | 0.3 | 0.8 | 0.2 | 0.5/0.03 |
|  | Dw/Dn | 1.3 | 1.3 | 1.4 | 1.2 | 1.5 |
|  | Porosity (%) | 70 | 65 | 70 | 60 | 65 |
|  | Heat decomposition temperature (°C.) | 400 | 390 | 390 | 395 | 395 |
| Composition material | Content (wt %) | 0.35 | 0.35 | 0.32 | 0.38 | 0.30/0.03 |
|  | Intrinsic viscosity (dl/g) | 0.62 | 0.62 | 0.62 | 0.61 | 0.62 |
| Film properties | Ra (μm) | 0.013 | 0.015 | 0.017 | 0.012 | 0.014 |
|  | Rt (μm) | 0.25 | 0.27 | 0.29 | 0.21 | 0.26 |
|  | Running ability (μk) | 0.22 | 0.24 | 0.30 | 0.25 | 0.24 |
|  | Abrasion resistance | Grade A | Grade A | Grade B | Grade A | Grade A |
|  | Magnetic face flaw preventability | Good | Good | Good | Good | Good |

TABLE 2

|  | Properties | Comparative example 1 | Comparative example 2 |
|---|---|---|---|
| Particles | Composition | Divinylbenzene/ethyl vinylbenzene | silicon dioxide |
|  | Molar ratio of components | 1:1 | — |
|  | Production method | Emulsion polymerization | — |
|  | Average diameter (μm) | 0.3 | 0.5 |
|  | Dw/Dn | 2.0 | 1.0 |
|  | Porosity (%) | 35 | 10 |
|  | Heat decomposition temperature (°C.) | 390 | — |
|  | Content (wt %) | 0.35 | 0.30 |
| Composition material | Intrinsic viscosity (dl/g) | 0.62 | 0.62 |
| Film properties | Ra (μm) | 0.015 | 0.020 |
|  | Rt (μm) | 0.30 | 0.27 |
|  | Running ability (μk) | 0.29 | 0.30 |
|  | Abrasion resistance | Grade C | Grade D |
|  | Magnetic face flaw preventability | Good | Poor |

TABLE 3

| | Properties | Example 6 | Example 7 | Comparative example 3 | Comparative example 4 |
|---|---|---|---|---|---|
| Particles | Composition | Fumaric acid/ ethylene glycol/ divinylbenzene | Maleic acid/ ethylene glycol/ ethylene glycol dimethacrylate | methyl methacrylate/ butyl acrylate/ divinylbenzene | calcium carbonate |
| | Molar ratio of components | 1:1:1 | 1:1:1 | 1:1:2 | — |
| | Production method | Suspension polymerization | Suspension polymerization | Emulsion polymerization | — |
| | Average diameter (μm) | 0.4 | 0.5 | 0.4 | 0.5 |
| | Dw/Dn | 1.4 | 1.2 | 1.5 | 5.5 |
| | Porosity (%) | 70 | 65 | 40 | 15 |
| | Heat decomposition temperature (°C.) | 395 | 390 | 390 | — |
| | Content (wt %) | 0.36 | 0.33 | 0.35 | 0.30 |
| Composition material | Intrinsic viscosity (dl/g) | 0.62 | 0.62 | 0.61 | 0.62 |
| Film properties | Laminated layer thickness t (μm) | 1.0 | 1.2 | 1.0 | 1.2 |
| | Ra (μm) | 0.024 | 0.023 | 0.029 | 0.030 |
| | Rt (μm) | 0.24 | 0.23 | 0.31 | 0.30 |
| | Protrusions (number/mm$^2$) | $2.0 \times 10^4$ | $1.8 \times 10^4$ | $1.0 \times 10^4$ | $0.8 \times 10^4$ |
| | Protrusions with 0.7–2.6 μm diameter (number/mm$^2$) | 3,000 | 3,200 | 2,500 | 12,000 |
| | Running ability (μk) | 0.21 | 0.20 | 0.31 | 0.34 |
| | Abrasion resistance | Grade A | Grade A | Grade D | Grade D |
| | Magnetic face flaw preventability | Good | Good | Poor | Poor |
| | Electromagnetic conversion property (dB) | +2.0 | +1.8 | −0.3 | −0.5 |

Electromagnetic conversion property is calculated in reference to Example 5.

TABLE 4

| | Properties | Example 8 | Example 9 | Example 10 | Example 11 | Example 12 |
|---|---|---|---|---|---|---|
| Particles | Composition | Terephthalic acid/ pentaerythritol | Terephthalic acid/ trimethylol-propane | Isophthalic acid/trimellitic acid/ethylene glycol | pyromellit acid/ethylene glycol + non-incorporated particles | 2,6-naphthale-nedicarboxylic acid/glycerin + zirconium oxide |
| | Molar ratio of components | 1:1 | 1:1 | 1:2:3 | 1:1 | 1:1 |
| | Average diameter (μm) | 0.3 | 0.3 | 1.0 | 0.2 | 0.5/0.03 |
| | Dw/Dn | 1.5 | 1.4 | 1.4 | 1.3 | 1.7 |
| | Porosity (%) | 65 | 60 | 50 | 40 | 55 |
| | Heat decomposition temperature (°C.) | 385 | 380 | 370 | 385 | 385 |
| | Content (wt %) | 0.30 | 0.3 | 0.25 | 0.35 | 0.30/0.03 |
| Composition material | Intrinsic viscosity (dl/g) | 0.62 | 0.61 | 0.62 | 0.62 | 0.62 |
| Film properties | Ra (μm) | 0.016 | 0.015 | 0.021 | 0.013 | 0.017 |
| | Rt (μm) | 0.25 | 0.24 | 0.40 | 0.23 | 0.26 |
| | Running ability (μk) | 0.23 | 0.26 | 0.28 | 0.27 | 0.25 |
| | Abrasion resistance | Grade A | Grade A | Grade B | Grade A | Grade A |
| | Magnetic face flawing preventability | Good | Good | Good | Good | Good |

TABLE 5

| | Properties | Comparative example 6 | Comparative example 7 |
|---|---|---|---|
| Particles | Composition | Terephthalic acid/ 1,4-cyclohexadimethanol | 2,6-naphthalenedicarboxylic acid/ethylene glycol |
| | Molar ratio of components | 1:1 | 1.1 |
| | Average diamter (μm) | 0.3 | 0.4 |
| | Dw/Dn | 1.3 | 6.0 |
| | Porosity (%) | 15 | 30 |
| | Heat decomposition temperature (°C.) | 355 | 360 |
| | Content (wt %) | 0.35 | 0.30 |
| Composition material | Intrinsic viscosity (dl/g) | 0.62 | 0.62 |
| Film properties | Ra (μm) | 0.023 | 0.025 |
| | Rt (μm) | 0.31 | 0.35 |
| | Running ability (μk) | 0.32 | 0.33 |
| | Abrasion resistance | Grade D | Grade D |
| | Magnetic face flaw preventability | Poor | Poor |

TABLE 6

| | Properties | Example 13 | Example 14 | Comparative example 7 |
|---|---|---|---|---|
| Particles | Composition | Trimellitic acid/1,4-cyclohexadimethanol | Trimellitic acid/bisphenol A | Terephthalic acid/isophthalic acid/bisphenol A |
| | Molar ratio of components | 1:1 | 1:1 | 4:1:5 |
| | Average diameter (μm) | 0.4 | 0.5 | 0.4 |
| | Dw/Dn | 1.2 | 1.4 | 5.5 |
| | Porosity (%) | 65 | 70 | 25 |
| | Heat decomposition temperature (°C.) | 390 | 395 | 345 |
| | Content (wt %) | 0.35 | 0.32 | 0.33 |
| Composition material | Intrinsic viscosity (dl/g) | 0.62 | 0.61 | 0.62 |
| Film properties | Laminated layer thickness t (μm) | 1.0 | 1.2 | 1.0 |
| | Ra (μm) | 0.021 | 0.023 | 0.030 |
| | Rt (μm) | 0.24 | 0.22 | 0.29 |
| | Protrusions (number/mm$^2$) | $2.1 \times 10^4$ | $2.0 \times 10^4$ | $0.9 \times 10^4$ |
| | Protrusions with 0.7–2.6 μm diameter (number/mm$^2$) | 2,800 | 2,900 | 1,200 |
| | Running ability (μk) | 0.23 | 0.24 | 0.33 |
| | Abrasion resistance | Grade A | Grade A | Grade D |
| | Magnetic face flawing preventability | Good | Good | Poor |
| | Electromagnetic conversion property (dB) | +1.8 | +2.0 | −0.6 |

Electromagnetic conversion property is calculated in reference to Example 5.

INDUSTRIAL APPLICATIONS OF THE INVENTION

The thermoplastic polyester compositions of the present invention contain crosslinked polymer particles excellent in affinity to polyesters. So, the films formed from the polyester compositions are hard to cause the particles to fall off during high speed running and hard to cause the particles to flaw magnetic faces. Therefore, the present invention can prevent the generation of white powder and the flawing of magnetic faces caused by falling-off particles, so as to avoid contamination caused during film production, and is especially suitable for use as products such as magnetic tapes.

We claim:

1. A polyester composition comprising crosslinked polymer particles with an ester bond at the main chain, said particles including at least a polyester formed from a polybasic acid or any of its ester formable derivatives and a polyhydric alcohol.

2. A polyester composition, according to claim 1 wherein the main chain of the crosslinked polymer particles is an unsaturated polyester resin with a dicarboxylic acid and a glycol as main components, at least either of the components having at least one aliphatic unsaturated bond, and crosslinked by a compound with at least one aliphatic unsaturated bond.

3. A polyester composition according to claim 1 wherein at least either of the polybasic acid or polyhydric alcohol comprise tri-or higher-valent.

4. A polyester composition, according to claim 1 wherein the crosslinked polymer particles are produced by suspension polymerization.

5. A polyester composition, according to claim 2, wherein the main chain of the crosslinked polymer particles is mainly composed of a dicarboxylic acid and a glycol, at least either of the components having one vinyl group, and crosslinked by a compound with one or two vinyl groups.

6. A polyester composition, according to claim 5, wherein the said crosslinked polymer particles are composed of maleic acid and/or fumaric acid as a main carboxylic acid component, and a compound selected from a group consisting of propenediol, butenediol, pentyl glycol, neopentyl glycol and bisphenol A as a main glycol component, with a compound selected from a group consisting of styrene, acrylic acid, diacrylic acid, methacrylic acid and dimethacrylic acid as a main crosslinking component.

7. A polyester composition, according to claim 5, wherein the said crosslinked polymer particles are composed of maleic acid and/or fumaric acid, and isophthalic acid and/or terephthalic acid as a main dicarboxylic acid components, and bisphenol A as a main glycol component, with styrene as a main crosslinking component.

8. A polyester composition, according to claim 3, wherein the polybasic acid and the polyhydric alcohol comprise at least either trivalent to tetravalent.

9. A polyester composition, according to claim 8, wherein the said crosslinked polymer particles are made of a polyester resin composed of a compound selected from a group consisting of terephthalic acid, isophthalic acid, maleic acid, trimesic acid trimellitic acid and pyromellitic acid as a main polybasic acid component, and a compound selected from a group consisting of ethylene glycol, cyclohexanedimethanol, bisphenol A, glycerol, trimethylolpropane and pentaerythritol as a main polyhydric alcohol component.

10. A polyester composition, according to claim 9, wherein the said crosslinked polymer particles are made of a polyester resin composed of trimetallitic acid and/or pyromellitic acid as a main polybasic acid component, and glycerol and/or pentaerythritol as a main polyhydric alcohol component.

11. A polyester composition, according to claim 1 wherein the crosslinked polymer particles are 0.01 to 5 μm in average diameter and 0.005 to 10 wt % in content.

12. A polyester composition, according to claim 1 wherein the crosslinked polymer particles are more than 1.1 to less than 5.0 in ratio Dw/Dn, wherein Dw is the weight average diameter and Dn is the number average diameter.

13. A polyester composition, according to claim 1 wherein the crosslinked polymer particles are 350° C. or higher in thermal decomposition temperature.

14. A polyester composition, according to claim 1 wherein the crosslinked polymer particles are 20 to 95% in porosity.

15. A polyester composition, according to claim 1 wherein a slurry of the crosslinked polymer particles in water and/or an organic compound of 200° C. or lower in boiling point is added to a polyester by using a vent type molding machine.

16. A polyester composition, according to claim 1, wherein inactive inorganic particles and/or organic particles of 0.001 to 3 μm in average diameter are contained by 0.01 to 10 wt %.

17. A film, comprising the polyester composition state in claim 1.

18. A laminated film, comprising at least one layer made of the polyester composition stated in claim 1.

19. A laminated film, according to claim 18, wherein the layer made of the said polyester composition is arranged at lest as the outermost layer on one side of the said laminated film.

20. A laminated film, according to claim 19, wherein the ratio t/D, where t represents the thickness of the outermost layer, and D represents the average diameter of the crosslinked polymer particles, is 0.1 to 10.

21. A laminated film, according to claim 19 or 20, wherein the number of the protrusions on the surface of the outermost layer is $3 \times 10^3$ to $2 \times 10^5$/mm².

22. A laminated film, according to claim 19 wherein the number of protrusions of 0.7 to 2.6 μm in diameter among protrusions existing on the outermost layer is 100 to 10,000/mm².

23. A film, according to claim 17 used as a base film for magnetic recording medium.

* * * * *

UNITED STATES PATENT AND TRADEMARK OFFICE
CERTIFICATE OF CORRECTION

PATENT NO. : 5,474,854
DATED : December 12, 1995
INVENTOR(S) : Nobuyuki Kagami et al It is certified that error appears in the above-indentified patent and that said Letters Patent is hereby corrected as shown below:

On the title page, at "[21]" please change "256,303" to --256,393--.

Column 7, line 7, please change "one" to --once--; and line 19, please change "ore" to --or--.

Column 17, line 5, please change "food" to --good--.

Column 23, line 32, after "acid", first occurrence, insert a comma --,--; and at line 39, please change "trimetallitic" to --trimellitic--.

Column 24, line 20, please change "state" to --stated--; and line 26, please change "lest" to --least--.

Signed and Sealed this

Fifth Day of March, 1996

*Attest:*

BRUCE LEHMAN

*Attesting Officer*    *Commissioner of Patents and Trademarks*